(12) United States Patent
De Koning et al.

(10) Patent No.: US 12,727,549 B2
(45) Date of Patent: Sep. 8, 2026

(54) METHOD FOR COLOURING FLOWERS OF POT PLANTS

(71) Applicant: DE KONING PLANTEN B.V., Honselersdijk (NL)

(72) Inventors: Robin Christiaan Gerardus De Koning, Honselersdijk (NL); Franciscus Johannus Gerardus De Koning, Honselersdijk (NL)

(73) Assignee: DE KONING PLANTEN B.V., Honselersdijk (NL)

( * ) Notice: Subject to any disclaimer, the term of this patent is extended or adjusted under 35 U.S.C. 154(b) by 0 days.

(21) Appl. No.: 18/865,704

(22) PCT Filed: May 17, 2023

(86) PCT No.: PCT/NL2023/050280
§ 371 (c)(1),
(2) Date: Nov. 14, 2024

(87) PCT Pub. No.: WO2023/224483
PCT Pub. Date: Nov. 23, 2023

(65) Prior Publication Data

US 2025/0143229 A1 May 8, 2025

(30) Foreign Application Priority Data

May 20, 2022 (NL) .................................... 2031942

(51) Int. Cl.
*A01G 7/06* (2006.01)

(52) U.S. Cl.
CPC .................................... *A01G 7/06* (2013.01)

(58) Field of Classification Search
CPC ........................................................ A01G 7/06
See application file for complete search history.

(56) References Cited

U.S. PATENT DOCUMENTS 2,687,598 A * 8/1954 Calhoun ............. A01M 21/043 111/7.3
2,870,576 A * 1/1959 Parker ...................... A01G 7/06 111/7.3

(Continued)

FOREIGN PATENT DOCUMENTS

CN 202565810 U 12/2012
CN 110291951 A 10/2019

(Continued)

*Primary Examiner* — William L Gmoser
(74) *Attorney, Agent, or Firm* — Ipsilon USA—NLO

(57) ABSTRACT

The invention concerns a method for changing the natural colour of the flowers of a pot plant, said method comprising the steps of:

(i) providing a pot plant having one or more stems, one or more flowers and a root system surrounded by a potting medium for pot plants;
(ii) providing a tubular injection device (1) comprising a hollow tube (2) having two ends (4*a*, 4*b*), wherein part of the wall (3) of the hollow tube (2) at one of the ends (4*a*) is removed so that an opening (5) of the hollow tube (2) at end (4*a*) has the form of an open gutter;
(iii) forcing the end (4*a*) of the hollow tube (2) into the tissue of a stem of the pot plant;
(iv) providing colourant with a colour different from the natural colour of the one or more flowers to the hollow tube (2) of the tubular injection device (1);
(v) exposing the tissue of the stem to the colourant for a period of time sufficiently long to change the colour of the one or more flowers; and
(vi) removing the tubular injection device, wherein no tissue is removed from the stem of the pot plant.

The invention further concerns pot plants obtainable by said method and pot plants having flowers, wherein the one or more flowers do not have their natural colour.

19 Claims, 5 Drawing Sheets

(56) References Cited

U.S. PATENT DOCUMENTS

| | | | | |
|---|---|---|---|---|
| 2,927,401 | A * | 3/1960 | Little | A01G 7/06 47/57.5 |
| 3,124,904 | A * | 3/1964 | Mauget | A01G 7/06 47/57.5 |
| 3,130,519 | A * | 4/1964 | Mauget | B65D 83/306 222/402.1 |
| 3,304,655 | A * | 2/1967 | Mauget | A01G 7/06 47/57.5 |
| 3,576,276 | A * | 4/1971 | Clarke | A01G 7/06 222/386 |
| 5,046,281 | A * | 9/1991 | Murphy | A01G 7/06 47/57.5 |
| 5,239,773 | A * | 8/1993 | Doolittle, Jr. | A01G 29/00 47/57.5 |
| 2015/0342123 | A1* | 12/2015 | McCurdy | A01G 7/06 47/5.5 |
| 2023/0016166 | A1* | 1/2023 | Jevsnik | A01G 7/06 |

FOREIGN PATENT DOCUMENTS

| | | | |
|---|---|---|---|
| CN | 216532757 | U | 5/2022 |
| EP | 0230828 | A1 | 8/1987 |
| NL | 2003621 | C2 | 4/2011 |
| NL | 1038389 | C2 | 5/2012 |
| NL | 2006581 | C2 | 10/2012 |
| NL | 2008189 | C2 | 7/2013 |
| NL | 2008491 | C2 | 9/2013 |
| NL | 2008753 | C2 | 11/2013 |
| NL | 1040904 | C2 | 3/2015 |
| NL | 1040870 | B1 | 5/2016 |
| WO | 2009143649 | A1 | 12/2009 |
| WO | 2012067496 | A1 | 5/2012 |
| WO | 2012141579 | A1 | 10/2012 |
| WO | 2016072851 | A1 | 5/2016 |

* cited by examiner

METHOD FOR COLOURING FLOWERS OF POT PLANTS

FIELD OF THE INVENTION

The invention relates to a method for colouring flowers of pot plants, in particular of plants of the orchid family (orchidaceae), to the pot plants obtainable by said method and to pot plants having flowers, wherein the one or more flowers do not have their natural colour.

BACKGROUND OF THE INVENTION

The invention relates to the colouring of flowers of pot plants. Over the years, many different techniques have been developed to change the natural colours of the flowers of pot plant, in particular of plants of the orchid family (orchidaceae).

One of these techniques concerns colouring the flowers of a pot plant by dissolving a dye in water, followed by pouring the resulting solution onto the soil around the roots of the plant such that the solution is taken up by the roots. The technique, however, has a very inefficient uptake of the dye into the roots and results in an only moderate and uneven discolouration of the flowers. Moreover, this technique leads to discoloured roots (at the exterior surface) which is unwanted from an aesthetic point of view and to soil contaminated with dye—because the major part of the dye solution sinks down along the roots into the soil—which is unwanted because it can easily result in spots and stains in the household environment where pot plants are typically applied.

NL1038389C and WO2012/067496A1 disclose a method for colouring flowers and/or leaves of plants, such as *Anthurium, Spathiphyllum, Rosa* L, *Kalanchoe, Curcuma* and Bromeliaceae. Said method comprises the steps of (i) physically injuring the roots of the plant such that an open fluid connection is obtained with the fluid sap flow in the xylem of the roots of the plant and (ii) contacting the physically injured roots with a liquid colourant. Like the previous technique, this method leads to discoloured roots which is unwanted from an aesthetic point of view and to soil contaminated with colorant liquid—because the major part of the colorant liquid sinks down along the roots into the soil—which is unwanted because it can easily result in spots and stains in the household environment where pot plants are typically applied.

NL2006581C and WO2012/141579A1 disclose a method for colouring flowers of a pot plant, such as *Phalaenopsis, Anthurium* and *Spathiphyllum*. Said method comprises the steps of (i) providing an injecting means which is provided with an injection needle, (ii) filling the injecting means with a quantity of colouring liquid which is non-toxic to the pot plant, (iii) arranging in the stem of the flower a bore with a diameter corresponding to the diameter of the injection needle, (iv) inserting the injection needle into the bore, (v) injecting the stem with the quantity of colouring liquid, and (vi) removing the injection needle from the stem following the injection. The bore is typically located halfway along the overall length of the stem, and can be sealed after removing the needle.

NL2003621C and EP230828A1 concern a method for colouring flowers of a pot plant, such as *Phalaenopsis, Anthurium* and *Spathiphyllum*. Said method comprises the steps of (i) providing a pipette, (ii) arranging in the stem of the flower a bore with a diameter corresponding to the diameter of the end of the pipette, (iii) inserting the end of the pipette into the bore and securing the pipette towards the stem, (iv) filling the pipette with a quantity of colouring liquid which is non-toxic to the pot plant after step (i), (ii) or (iii), and (v) removing the pipette from the stem.

NL2008753C discloses a method for colouring a flower of a plant comprising the steps of applying a supply opening in the root, bulb, stem and/or root neck, and supplying colourant in the form of a powder or paste to the plant via the supply opening. The powder can be injected into the plant under pressure. Alternatively, an opening in the form of a hole can be applied in the plant, followed by putting the colourant in the opening and sealing the hole. A needle having a diameter between 0.5 and 2.0 mm with a syringe as a reservoir for the powderous colourant can be used. It is described that the needle-syringe combination can be used to apply the colourant to the plant under pressure, but that the colourant can also be applied to the plant without applying pressure. NL2008753C further discloses a plant obtainable by the method. According to the teaching of NL2008753C, the plant obtainable by the method wherein colourant is applied via the stem either has an incision in the stem in the form of a complete circle or a hole in the stem that is sealed with a different material. As shown in the experimental section, the present inventors have found that the removal of a needle having a diameter between 0.5 and 2.0 mm from the stem automatically results in removal of tissue from the stem, i.e. the plug of stem tissue that fills part of the needle when pushing the needle into the stem is removed from the stem when pulling back the needle. Accordingly, the method of NL2008753C wherein colourant is applied via the stem always results in substantial damage to the tissue of the stem. The present inventors have further found that using a needle-syringe combination wherein the needle is pushed into the stem, the syringe is filled with coulorant and wherein no pressure is applied does not lead to colouring of the flowers because an air bubble in the needle will prevent the colourant to reach the supply opening in the tissue of the stem.

NL2008189C discloses a method for colouring a flower of a plant comprising the steps of applying a supply opening in the root, bulb and/or root neck, and supplying colourant to the plant via the supply opening. A needle having a diameter between 0.5 and 2.0 mm with a syringe as a reservoir for the colourant can be used. It is described that a needle-syringe combination can be used to apply the colourant to the plant under pressure, but that the colourant can also be applied to the plant without applying pressure. NL2008189C further discloses a plant obtainable by the method. According to the teaching of NL2008189C, the plant obtainable by the method either has an incision in the root, bulb and/or root neck in the form of a complete circle or a hole in the root, bulb and/or root neck that is sealed with a different material. The stem(s) of the plant obtainable by the method are, however, undamaged. As shown in the experimental section, the present inventors have found that the removal of a needle having a diameter between 0.5 and 2.0 mm from the tissue of the plant automatically results in removal of tissue, i.e. the plug of tissue that fills part of the needle when pushing the needle into the plant is removed from the plant when pulling back the needle. Accordingly, the method of NL2008189C wherein colourant is applied via the root, bulb and/or root neck always results in substantial damage to the tissue of the root, bulb and/or root neck. The present inventors have further found that using a needle-syringe combination wherein the needle is pushed into the tissue, the syringe is filled with coulorant and wherein no pressure is applied does not lead to colouring of the flowers because an air bubble in the needle will prevent the colourant to reach the supply opening in the tissue.

NL1040904C discloses a substance, such as a colourant, introduction method for plants, among which are plants of the orchid family such as *Phalaenopsis* orchids and *Dendrobium* orchids. This method comprises the steps of (i) forming a final hole into a stem of the plant, wherein the final hole is accessible via an opening in an outer surface of the stem, and wherein the final hole has a dimension in a direction parallel to a longitudinal axis of the stem which is larger than a maximum dimension of the opening in said direction parallel to the longitudinal axis of the stem and (ii) subjecting the interior of the final hole to the substance by introducing the substance through the opening. After introduction of the substance into the plant, the final hole may be closed.

The methods disclosed in NL2006581C, WO2012/141579A1, NL2008753C, NL2003621C, EP230828A1 and NL1040904C result in substantial damage to the tissue of the stem of the pot plant and, consequently, to an unwanted weakening of the stem. The methods disclosed in NL2008753C and NL2008189C result in a very inefficient colouring process of the flowers, if the flowers change colour at all.

There is a need for novel methods for changing the natural colour of the flower or flowers of pot plants that do not have the drawbacks of the prior art.

Accordingly, it is an object of the invention to provide a method for changing the natural colour of the flower or flowers of pot plants in an efficient way that results in less damage to the stem of the pot plant, more particularly that results in a higher survival rate of the pot plant.

It is another object of the invention to provide a method for changing the natural colour of the flower or flowers of pot plants wherein the potting plant medium surrounding the roots of the pot plant is not contaminated with colourant.

It is a further object of the invention to provide a method for changing the natural colour of the flower or flowers of pot plants wherein the root system of the plant is not damaged and which does not result in the discolouration of the root system of the plant.

It is a still further object of the invention to provide a method for efficiently changing the natural colour of the flower or flowers of pot plants wherein the stem or stems of the pot plant are as little damaged as possible.

It is yet another object of the invention to provide a method for changing the natural colour of the flower or flowers of pot plants with an increased survival rate of the pot plants obtainable by said method.

SUMMARY OF THE INVENTION

The inventors have unexpectedly found that the flowers of pot plants can be uniformly and homogeneously coloured in an efficient way via a very small incision in the stem(s), without removing plant tissue from the stem. After the colouring process, the pot plants can, apart from the discolouration of the flower or flowers, hardly be distinguished from the original pot plants, i.e. they only have hardly noticeable visible signs of damage. The inventors have further found that the process using this very small incision results in a higher percentage of pot plants that survive the colouring process as compared to the processes employed in the prior art.

Accordingly, in a first aspect, the invention provides a method for changing the natural colour of the flower or flowers of a pot plant, said method comprising the steps of:

(i) providing a pot plant having one or more stems, one or more flowers and a root system surrounded by a potting medium for pot plants;

(ii) providing a tubular injection device (1) comprising a hollow tube (2) having a wall (3) with a thickness (d) in a radial direction of the hollow tube (2), a maximum size (D) in a radial direction of the hollow tube (2), a length (L) in a longitudinal direction of the hollow tube (2) and two ends (4*a*, 4*b*), wherein part of the wall (3) of the hollow tube (2) at one of the ends (4*a*) is removed so that an opening (5) of the hollow tube (2) at end (4*a*) has the form of an open gutter, wherein the part of the wall (3) of the hollow tube (2) at end (4*a*) that is removed extends from end (4*a*) over a first distance ($L_1$) in the longitudinal direction of the hollow tube (2);

(iii) forcing the end (4*a*) of the hollow tube (2) into the tissue of a stem of the pot plant over a second distance ($L_2$) that is smaller than first distance ($L_1$);

(iv) providing colourant with a colour different from the natural colour of the one or more flowers to the hollow tube (2) of the tubular injection device (1);

(v) exposing the tissue of the stem to the colourant of step (iv) for a period of time sufficiently long to change the colour of the one or more flowers; and (vi) removing the tubular injection device (1) from the stem of the pot plant, wherein no tissue is removed from the stem of the pot plant.

Since the end (4*a*) of the hollow tube (2) is forced into the tissue of a stem of the pot plant over a second distance ($L_2$) that is smaller than first distance ($L_1$), there is always an opening through which air can escape from the hollow tube (2) after colourant is provided to the hollow tube (2) in step (iv). In other words, colourant provided to the hollow tube (2) can always reach the tissue of the stem.

In a second aspect, the invention provides a pot plant obtainable by the method according to the first aspect.

In a third aspect, the invention provides a pot plant having one or more flowers, one or more stems and a root system surrounded by potting medium for pot plants, wherein the one or more flowers do not have their natural colour, and wherein:

the one or more stems have an incision in the form of part of a circle, part of an oval, part of a square, part of a triangle, or part of a rectangle, wherein the tissue of the one or more stems within the part of the circle, part of the oval, part of the square, part of the triangle, or part of the rectangle is still present;

the root system of the pot plant is not physically injured;

the potting medium for pot plants surrounding the root system is not contaminated with the colourant; and the exterior surface of the root system has its natural colour.

Definitions

The term 'colouring flowers' in the context of the present invention refers to 'changing the natural colour of flowers'. In the context of the present invention, 'white' can also be a (natural) colour of the flowers.

The term 'pot plant' as used herein is considered to be similar to 'potted plant', and refers to plants that are typically cultivated and displayed in a pot, such as houseplants that are placed in residences and offices, particularly for decorative purposes.

The terms 'stem' or as used herein does not include 'leaf stems', 'branches' or 'twigs', unless indicated otherwise.

The term 'potting medium for pot plants' as used herein encompasses for example 'soil', 'potting soil', 'garden soil', and structured potting media such as 'potting bark'.

The term 'root system' as used herein encompasses root or roots, root neck, bulb and tuber.

The term 'open gutter' in the context of the present invention refers to a shallow through or channel that is open at the top, for carrying for example a liquid from a first location to a second location. The open gutter has the form of a 'gouge'. The wording 'has the form of an open gutter' as used herein is considered interchangeable with 'has the form of a gouge'.

DETAILED DESCRIPTION

Method

Figure 1:
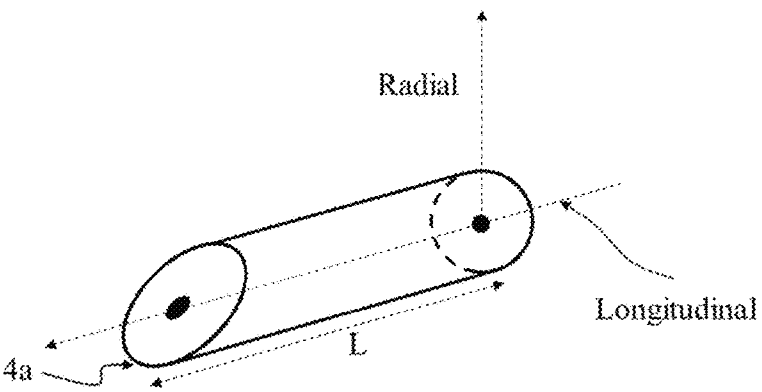
FIG. 1 indicates the radial and longitudinal directions of a hollow tube.

In a first aspect, the invention concerns a method for changing the natural colour of the flower or flowers of a pot plant, said method comprising the steps of:

(i) providing a pot plant having one or more stems, one or more flowers and a root system surrounded by a potting medium for pot plants;

(ii) providing a tubular injection device (1) comprising a hollow tube (2) having a wall (3) with a thickness (d) in a radial direction of the hollow tube (2), a maximum size (D) in a radial direction of the hollow tube (2), a length (L) in a longitudinal direction of the hollow tube (2) and two ends (4*a*, 4*b*), wherein part of the wall (3) of the hollow tube (2) at one of the ends (4*a*) is removed so that an opening (5) of the hollow tube (2) at end (4*a*) has the form of an open gutter, wherein the part of the wall (3) of the hollow tube (2) at end (4*a*) that is removed extends from end (4*a*) over a first distance ($L_1$) in the longitudinal direction of the hollow tube (2);

(iii) forcing the end (4*a*) of the hollow tube (2) into the tissue of a stem of the pot plant over a second distance ($L_2$) that is smaller than first distance ($L_1$);

(iv) providing colourant with a colour different from the natural colour of the one or more flowers to the hollow tube (2) of the tubular injection device (1);

(v) exposing the tissue of the stem to the colourant of step (iv) for a period of time sufficiently long to change the colour of the one or more flowers; and (vi) removing the tubular injection device (1) from the stem of the pot plant, wherein no tissue is removed from the stem of the pot plant.

As will be appreciated by those skilled in the art, steps (iii)-(vi) can be, and preferably are, repeated for every individual stem, either consecutively or simultaneously.

Step (i): Providing a Pot Plant

In step (i), a pot plant having one or more stems, one or more flowers and a root system surrounded by a potting medium is provided.

Although in step (i) a pot plant is provided, the process as defined herein does not necessarily require the presence of a pot. The process can also be performed when the pot plant is not present in a pot, although the presence of a pot is preferred.

Similarly, the process as defined herein does not necessarily require the presence of the potting medium for pot plants. The process can also be performed when the root system is, temporarily, not surrounded by a potting medium for pot plants.

In an embodiment, the potting medium for pot plants is chosen from soil, potting soil, garden soil, soil structuring agents, potting bark and combinations thereof.

In a preferred embodiment, the one or more flowers of the pot plant provided in step (i) have a natural colour with high saturation and high brightness.

In another preferred embodiment, the one or more flowers of the pot plant provided in step (i) have a natural colour chosen from the group consisting of white, off-white, pearl, ivory and yellow. In a very preferred embodiment, the one or more flowers of the pot plant provided in step (i) have a natural colour chosen from white and off-white. Most preferably, the natural colour is white.

The pot plant is preferably chosen from the group consisting of the orchid family (orchidaceae), *Anthurium* and *Spathiphyllum*.

In a more preferred embodiment, the pot plant is chosen from plants of the orchid family (orchidaceae), even more preferably chosen from *Phalaenopsis* orchids and *Dendrobium* orchids, most preferably from *Phalaenopsis* orchids.

Step (ii): Providing a Tubular Injection Device (1)

In step (ii), a tubular injection device (1) is provide comprising a hollow tube (2) having a wall (3) with a thickness (d) in a radial direction of the tube (2), a maximum size (D) in a radial direction of the hollow tube (2), a length (L) in a longitudinal direction of the hollow tube (2) and two ends (4*a*, 4*b*), wherein part of the wall (3) of the hollow tube (2) at one of the ends (4*a*) is removed so that an opening (5) of the hollow tube (2) at end (4*a*) has the form of an open gutter, wherein the part of the wall (3) of the hollow tube (2) at end (4*a*) that is removed extends from end (4*a*) over a first distance ($L_1$) in the longitudinal direction of the hollow tube (2).

What is meant with a radial and longitudinal direction of a hollow tube is indicated in FIG. 1.

Structures in the form of an open gutter are well known to the skilled person. They concern a shallow through or channel that is open at the top, for carrying for example a liquid from a first location to a second location. Examples of tubular injection devices (1) wherein part of the wall (3) of the hollow tube (2) at one of the ends (4*a*) is removed so that an opening (5) of the hollow tube (2) at end (4*a*) has the form of an open gutter are depicted in FIGS. 2A-2F. As is clear from FIGS. 2A-2F, the opening (5) in the form of an open gutter extends over a first distance ($L_1$) in the longitudinal direction of the hollow tube (2).

In embodiments, the first distance ($L_1$) is larger than the diameter of the stem of the pot plant. In other embodiments, the first distance ($L_1$) is between 3 mm and 2 cm, such as between 4 mm and 1 cm. In yet other embodiments, the first distance ($L_1$) is between 3 mm and 1.8 cm, such as between 3 mm and 1.5 cm, between 3 mm and 1.2 cm, between 3 mm and 1 cm, between 3 mm and 8 mm or between 3 mm and 6 mm. In still other embodiments, the first distance ($L_1$) is between 4 mm and 2 cm, such as between 5 mm and 2 cm or between 6 mm and 2 cm.

As will be appreciated by those skilled in the art, the smaller the thickness (d) of the wall (3) in a radial direction of the hollow tube (2), the less tissue of the stem of the pot plant is injured when the end (4*a*) of the hollow tube (2) is forced into the tissue of a stem of the pot plant and the lower the risk that tissue of the stem of the pot plant is removed on subsequent removal of the tubular injection device (1). It is, however, only (at least part of) the opening (5) in the form of an open gutter that is forced into the tissue of a stem of the pot plant. Hence, the remainder of the wall (3) of hollow tube (2) need not have a small thickness (d). In a preferred embodiment, the thickness (d) of wall (3) at end (4*a*), preferably of the wall (3) of the whole opening (5) in the form of an open gutter, is between 0.1 and 1 mm, more preferably between 0.15 and 0.7 mm, such as between 0.2 and 0.5 mm or between 0.25 and 0.4 mm. In another preferred embodiment, the thickness (d) of wall (3) at end (4*a*), preferably of the wall (3) of the whole opening (5) in the form of an open gutter, is between 0.1 and 0.9 mm, such as between 0.1 and 0.8 mm, between 0.1 and 0.7 mm, between 0.1 and 0.6 mm, between 0.1 and 0.5 mm or between 0.1 and 0.4 mm.

As will be appreciated by those skilled in the art, the maximum size (D) in a radial direction of the hollow tube (2) at end (4*a*), preferably of the whole opening (5) in the form of an open gutter, should not be larger than the diameter of the stem of the pot plant.

In a preferred embodiment, the maximum size (D) in a radial direction of the hollow tube (2) at end (4*a*), preferably of the whole opening (5) in the form of an open gutter, is between 1 and 5 mm, more preferably between 2 and 4.5 mm, even more preferably between 2.5 and 4.2 mm, such as 3, 3.5 or 4 mm. The maximum size (D) in a radial direction of that part of the hollow tube (2) that is not forced into the tissue of the stem of the pot plant is limited in no way. However, for practical reasons, it preferably is between 1 mm and 4 cm, more preferably between 2 mm and 2 cm.

The length (L) of the hollow tube (2) is limited in no way. However, for practical reasons, it preferably is between 1 and 15 cm, more preferably between 1 and 10 cm.

The form of the cross section of the hollow tube (2) in a radial direction is not particularly limited. However, in a preferred embodiment, the hollow tube (2) has a circular, oval, triangular, square or rectangular cross section or a combination thereof in a radial direction of the hollow tube (2). As will be appreciated by those skilled in the art, this preferred form of the cross section in a radial direction does not concern the opening (5) in the form of an open gutter. If, for example, the hollow tube (2) has a circular cross section in a radial direction, the opening (5) in the form of an open gutter has the form of part of a circle (see FIG. 2D and FIG. 2F). Likewise, if the hollow tube (2) has a rectangular cross section in a radial direction, the opening (5) in the form of an open gutter has the form of part of a rectangle (see FIGS. 2B and 2C). Furthermore, if the hollow tube (2) has a triangular cross section in a radial direction, the opening (5) in the form of an open gutter has the form of part of a triangle (see FIGS. 2A and 2E).

In a preferred embodiment, the wall (3) of hollow tube (2) at the opening (5) in the form of an open gutter has the form of part of a circle, part of an oval, part of a square, part of a triangle or part of a rectangle, in a radial direction of the hollow tube (2).

Figure 2A:
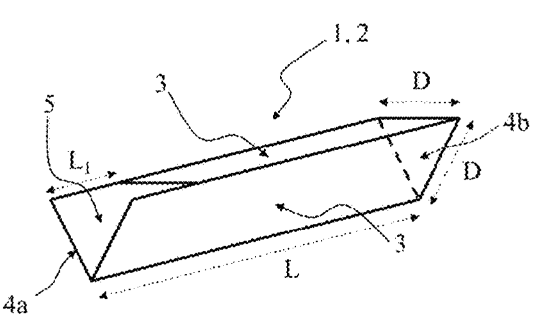
FIG. 2A-2F depict tubular injection devices wherein part of the wall at one of the ends is removed so that one opening has the form of an open gutter or gouge.
Figure 2B:
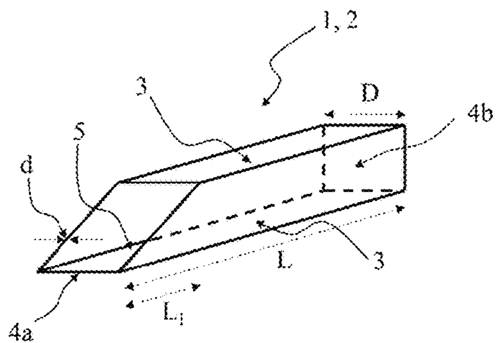
Figure 2C:
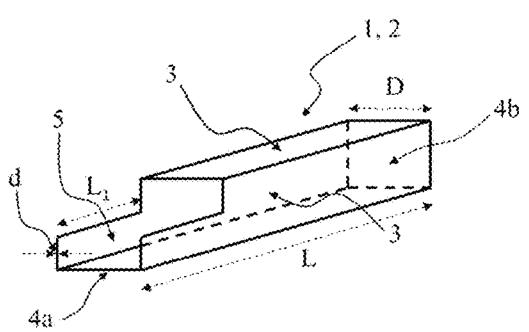
Figure 2D:
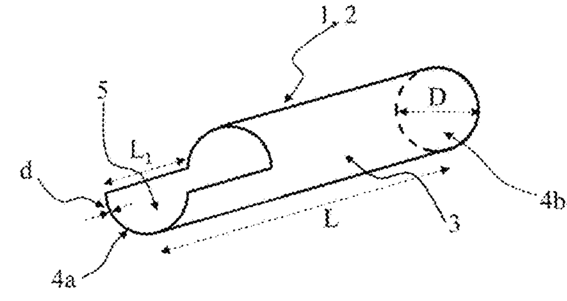
Figure 2E:
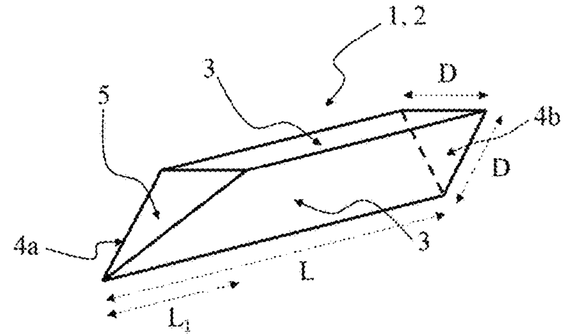
Figure 2F:
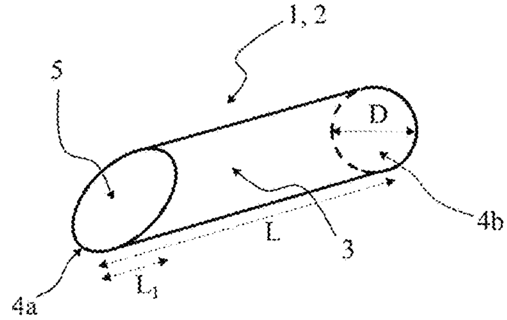

In a preferred embodiment, the wall (3) of hollow tube (2) at the opening (5) in the form of an open gutter has the form of a hemicircle, in a radial direction of the hollow tube (2) (see FIG. 2D).

In an embodiment, the opening (5) in the form of an open gutter is a bevelled part of hollow tube (2) (see FIG. 3E and FIG. 3F).

In a preferred embodiment, the tubular injection device (1) further comprises a reservoir suitable for holding colourant. The tubular injection device (1) can for example be a needle equipped with a syringe, wherein the needle is the hollow tube (2) and wherein the syringe comprises the reservoir.

Step (iii): Forcing the End (4*a*) of the Hollow Tube (2) into the Tissue of the Stem In step (iii), the end (4*a*) of the hollow tube (2) is forced into the tissue of a stem of the pot plant over a second distance ($L_2$) that is smaller than first distance ($L_1$).

Figure 3A:
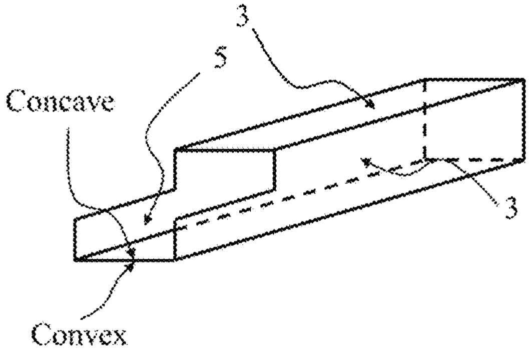
FIG. 3 indicates concave and convex surfaces of the wall of one of the openings having the form of an open gutter or gouge.
Figure 3B:
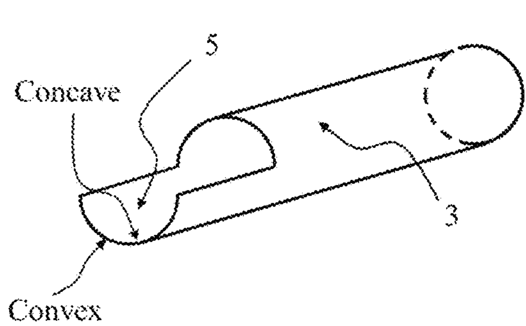

As will be appreciated by the skilled person, the tubular injection device (1) is positioned so that it can guide colourant through the hollow tube and opening (5) in the form of an open gutter into the stem. Hence, in step (iii), the end (4*a*) of the hollow tube (2) is forced into the tissue of a stem of the pot plant such that a convex surface of wall (3) at opening (5) in the form of an open gutter is facing downwards and a concave surface of wall (3) at opening (5) in the form of an open gutter is facing upwards, wherein the upward direction is a direction parallel to the longitudinal axis of the stem from the root system to the one or more flowers. What is meant with a convex surface and concave surface of wall (3) of the opening (5) in the form of a gutter is indicated in FIGS. 3A and 3B.

In a preferred embodiment, in step (iii), the end (4*a*) of the hollow tube (2) is forced into the tissue of a stem of the pot plant at an angle with the stem, such that end (4*b*) of the hollow tube (2) points upwards, wherein the upward direction is a direction parallel to the longitudinal axis of the stem from the root system to the one or more flowers. This positioning helps colourant to flow to the stem of the pot plant.

As is explained hereinbefore, in the method according to the first aspect, no tissue of the stem is removed from the pot plant. Hence, the end (4*a*) of the hollow tube (2) is forced into the tissue of a stem without first removing tissue from the stem of the pot plant.

The end (4*a*) of the hollow tube (2) is preferably forced into the tissue of a stem of the pot plant within 5 cm from the root system, preferably within 2 cm from the root system, i.e. not into the root neck or root system itself.

As explained hereinbefore, part of the wall (3) of the hollow tube (2) at one of the ends (4*a*) is removed so that an opening (5) of the hollow tube (2) at end (4*a*) has the form of an open gutter, wherein the part of the wall (3) of the hollow tube (2) at end (4*a*) that is removed extends from end (4*a*) over a first distance ($L_1$) in the longitudinal direction of the hollow tube (2). Hence, opening (5) of the hollow tube (2) at end (4*a*) in the form of an open gutter has a length ($L_1$). By forcing the end (4*a*) of the hollow tube (2) into the tissue of a stem of the pot plant over a second distance ($L_2$) that is smaller than first distance ($L_1$), one makes sure that the incision made in the stem has for example the form of part of a circle, part of an oval, part of a square, part of a triangle or part of a rectangle instead of a whole circle, a whole oval, a whole square, a whole triangle or a whole rectangle, respectively. By doing so, the risk of removing tissue from the stem of the pot plant on removing the tubular injection device (1) is considerably reduced. The inventors have unexpectedly established that this incision, resulting in only minor damage to the tissue of the stem of the pot plant and resulting in only a very small contact area for colourant with plant tissue, is nevertheless sufficient for colouring the flowers of the pot plant in only a couple of hours. Moreover, since $L_2 < L_1$, there is always an opening between the stem and the hollow tube (2) through which air can escape after colourant is provided to the hollow tube (2) in step (iv). In other words, colourant provided to the hollow tube (2) can always flow to and reach the tissue of the stem and will not be obstructed by an air bubble.

In a preferred embodiment, the end (4*a*) of the hollow tube (2) is forced into the tissue of a stem of the pot plant over a second distance ($L_2$) that is more than 70% of the first distance ($L_1$), more preferably more than 80%, even more preferably more than 95%, yet more preferably more than 98%. In another preferred embodiment, the end (4*a*) of the hollow tube (2) is forced into the tissue of a stem of the pot plant over a second distance ($L_2$) that is between 1 and 4 mm, more preferably between 1.5 and 3 mm, such as 2 or 2.5 mm. In yet another preferred embodiment, the end (4*a*) of the hollow tube (2) is forced into the tissue of a stem of the pot plant over a second distance ($L_2$) that is between 1 and 3.5 mm, such as between 1 and 3.0 mm, between 1 and 2.5 mm or between 1 and 2 mm.

As will be appreciated by those skilled in the art, the second distance ($L_2$) should not be larger than the diameter of the stem of the pot plant, preferably not larger than 50% of the diameter of the stem of the pot plant, more preferably not larger than 40% of the diameter of the stem of the pot plant.

In a preferred embodiment, the end (4*a*) of the hollow tube (2) is forced into the tissue of a stem of the pot plant over a second distance ($L_2$) that is up to but not including the first distance ($L_1$). By doing so, the risk of leakage of colourant from the hollow tube (2) to the environment, e.g. to the root system, is considerably reduced, whereas air can still escape from the hollow tube (2) after colourant is provided to the hollow tube (2) in step (iv).

Step (iv): Proving Colourant

In step (iv), colourant is provided to the hollow tube. As will be appreciated by those skilled in the art, the colourant is chosen from colourants that are (at least in the amounts applied to the plant) non-toxic to the pot plant. Moreover, the colourant is chosen from colourants that can be taken up by the sap flow of the pot plant when they are contacted with the sap flow.

The colourant can also be a mixture of two or more colourants, such as a mixture of two or more dyes.

In a preferred embodiment, the colourant is a liquid colourant, more preferably an aqueous solution of one or more dyes. The term 'aqueous solution' means that the solvent of the dye comprises or consists of water. The solvent can however also comprise small amounts of co-solvents for the dye and one or more salts. In an embodiment, the colourant is a liquid colourant being an aqueous solution of a dye, optionally comprising one or more co-solvents for the dye and optionally comprising one or more salts.

In a very preferred embodiment, the colourant is blue, more preferably an aqueous solution of one or more blue dyes.

In an embodiment, the colourant is a dye in powder form. Colouring the one or more flowers of the pot plant with a colourant being a dye in powder form is less preferred than colouring the one or more flowers with a liquid colourant because the dye in powder form is less easily taken up by the sap streams of the leaves.

It is within the skills of the artisan to choose a suitable amount of colourant. In an embodiment wherein a liquid colourant, such as a concentrated aqueous solution of one or more dyes, is applied, the amount is typically between 0.3 and 4 ml, preferably between 0.5 and 1 ml.

In an embodiment wherein a colourant that is a dye in powder form is applied, the amount is typically between 0.2 and 2 g.

Step (v): Exposing the Tissue to the Colourant

In step (v), the tissue of the stem of the pot plant is exposed to the colourant for a period of time sufficiently long to change the colour of the one or more flowers. It is within the skills of the artisan to choose an exposure time that results in the intended (extent of the) uniform and homogeneous colour change of the one or more flowers.

In a preferred embodiment, the period of time applied in step (v) is between 2 and 24 hours, more preferably between 4 and 18 hours, even more preferably between 6 and 12 hours, such as 7, 8, 9, 10 or 11 hours.

As will be appreciated by the skilled person, no pressure is applied during step (v).

The pot plant may be supplied with water before step (v). If the one or more flowers of the pot plant are coloured with a colourant being a dye in powder form, it is preferred that the pot plant is supplied with water before step (v).

Step (vi): Removing the Tubular Injection Device

In step (vi), the tubular injection device (1) is carefully removed from the stem of the pot plant. The inventors have found that this can be performed without removing any tissue from the stem.

Pot Plant

In a second aspect, the invention provides a pot plant obtainable by the process according to the first aspect.

In a preferred embodiment of the second aspect, a pot plant obtainable by the process according to the first aspect is provided, wherein:

- the root system of the pot plant is not physically injured;
- the potting medium for pot plants surrounding the root system is not contaminated with the colourant; and
- the exterior surface of the root system has its natural colour.

A physically injured root system refers to a root system that has been damaged by for example bruising, breaking, cutting, sawing or drilling.

In a preferred embodiment of the second aspect, at least one stem of the pot plant has an incision in the form of part of a circle, part of an oval, part of a square, part of a triangle, or part of a rectangle.

In a third aspect, the invention provides a pot plant having one or more flowers, one or more stems and a root system surrounded by potting medium for pot plants, wherein the one or more flowers do not have their natural colour, and wherein:

- the one or more stems have an incision in the form of part of a circle, part of an oval, part of a square, part of a triangle, or part of a rectangle, wherein the tissue of the one or more stems within the part of the circle, part of the oval, part of the square, part of the triangle, or part of the rectangle is still present;
- the root system of the pot plant is not physically injured;
- the potting medium for pot plants surrounding the root system is not contaminated with the colourant; and
- the exterior surface of the root system has its natural colour.

As will be appreciated by those skilled in the art, no tissue is removed from the one or more stems in the pot plant according to the third aspect.

In a preferred embodiment, the pot plant according to the third aspect is chosen from the group consisting of the orchid family (orchidaceae), *Anthurium* and *Spathiphyllum*, preferably chosen from plants of the orchid family (orchidaceae), more preferably chosen from *Phalaenopsis* orchids and *Dendrobium* orchids, most preferably from *Phalaenopsis* orchids.

Figure 8:
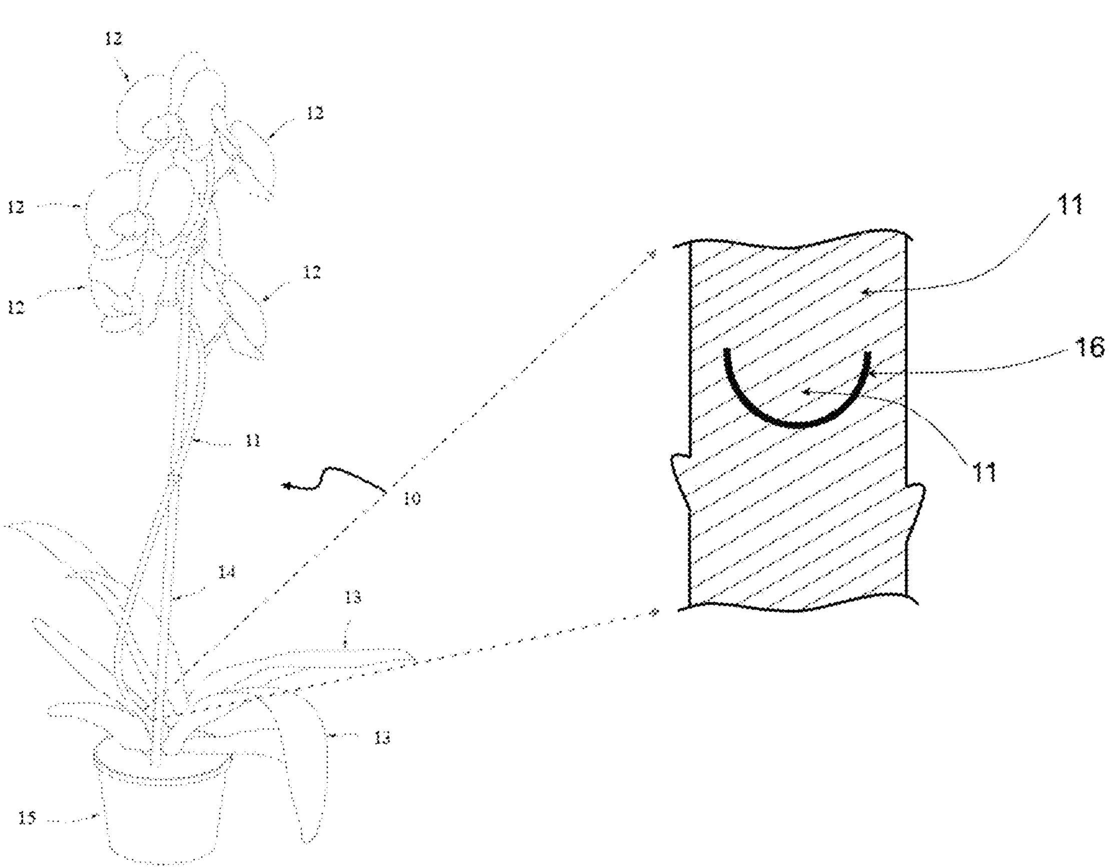
FIG. 8 depicts a *Phalaenopsis* pot plant after the colouring process according to the invention.

To the best of the knowledge of the inventors, the pot plants according to the second and third aspect are novel over the prior art because they (only) have an incision in their stems in the form of part of a circle, part of an oval, part of a square, part of a triangle, or part of a rectangle, wherein the tissue of the stems within the part of the circle, part of the oval, part of the square, part of the triangle, or part of the rectangle is still present (see FIG. 8) and since no tissue is removed from the one or more stems at other places.

Thus, the invention has been described by reference to certain embodiments discussed above. It will be recognized that these embodiments are susceptible to various modifications and alternative forms well known to those of skill in the art.

Furthermore, for a proper understanding of this document and its claims, it is to be understood that the verb 'to comprise' and its conjugations are used in its non-limiting sense to mean that items following the word are included, but items not specifically mentioned are not excluded. In addition, reference to an element by the indefinite article 'a' or 'an' does not exclude the possibility that more than one of the element is present, unless the context clearly requires that there be one and only one of the elements. The indefinite article 'a' or 'an' thus usually means 'at least one' or 'one or more'.

EXAMPLES

Example 1

Colouring experiments were performed as follows.

In a first step, a number of 6 *Phalaenopsis* pot plants having white flowers (natural colour) were provided. They all had at least two stems with flowers.

Figure 4:
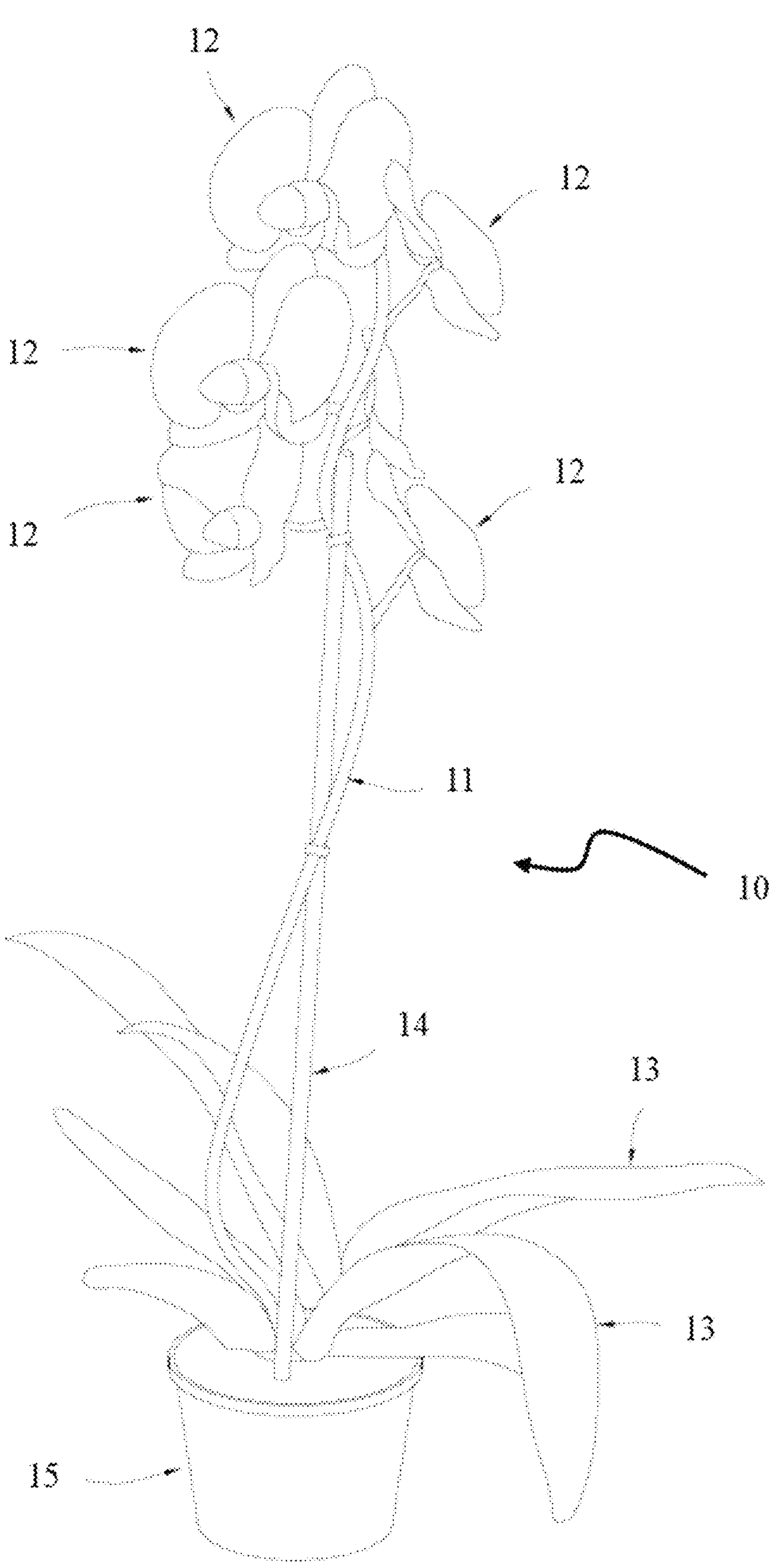
FIG. 4 depicts a *Phalaenopsis* pot plant having flowers, stems and leaves before the colouring process, i.e. the flowers still have their natural colour.

As an example, FIG. 4 depicts a *Phalaenopsis* pot plant (10) having a single stem (11) with flowers (12) and leaves (13) before the colouring process, i.e. the flowers (12) still have their natural colour. In FIG. 4, the stem (11) is attached via a clip to a support (14). The *Phalaenopsis* pot plant is provided with a pot (15) containing the root system and surrounding potting medium for pot plants (not shown).

The following procedure was followed for every individual stem of every individual *Phalaenopsis* pot plant.

Figure 5:
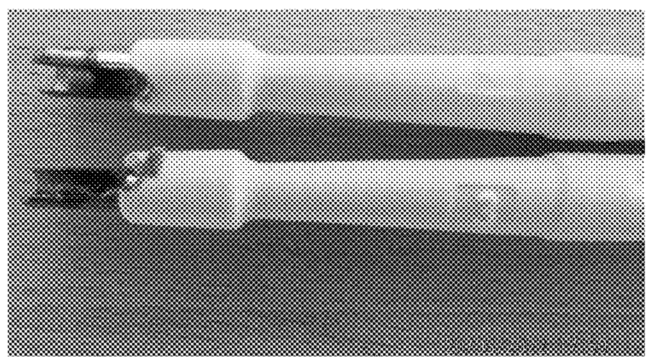
FIG. 5 depicts tubular injection devices with openings in the form of an open gutter or gouge wherein the wall at one of the openings in a radial direction has the form of a hemicircle.

As tubular injection devices, punches for industrial use from Ribbel International Limited, India, were used. The punches had very sharp stainless steel openings with a circular diameter of either 3 mm (Lot 15-2122-30) or 4 mm (Lot 15-2122-40). Part of the stainless steel openings of the punches was removed (about 5 mm in the longitudinal direction of the punch) to provide openings in the form of a gouge or an open gutter wherein the wall at the openings had the form of a hemicircle, in a radial direction of the modified punches (see FIG. 5).

Figure 6:
FIG. 6 depicts a *Phalaenopsis* pot plant with two tubular injection devices forced into two stems under an angle with the stems.

The opening of a modified punch was forced about 2 mm into a stem of a *Phalaenopsis* pot plant, under an angle with the stem, about 0.5-2 cm from the root neck of the *Phalaenopsis* pot plant (FIG. 6). This was sufficient to hold the modified punch in this position without further support. Since part of the stainless steel openings of the punches was removed over a length of about 5 mm in the longitudinal direction of the punch and since the modified punch was forced about 2 mm into the stem of the *Phalaenopsis* pot plant, there remained a small opening between the upper part of the stainless steel part of the modified punch and the stem through which air can escape.

Figure 7:
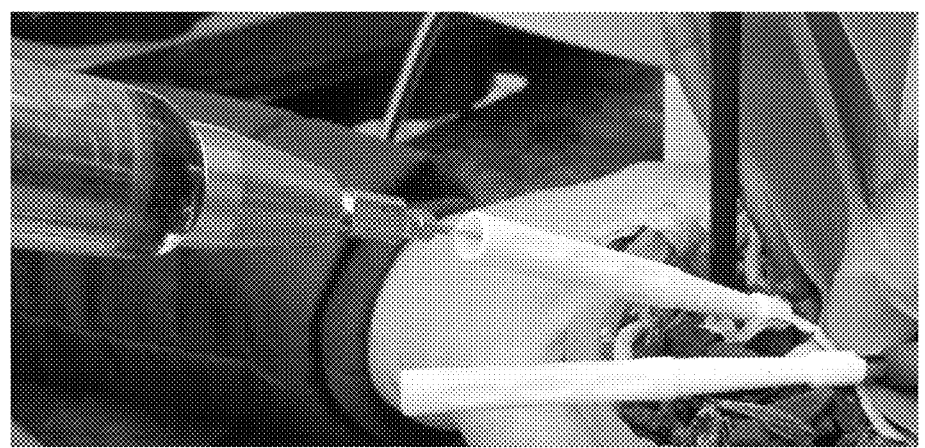
FIG. 7 depicts the process of filling the tubular injection devices with a liquid colourant.

This process was repeated for every stem of each of the 6 *Phalaenopsis* pot plants. Both the modified punches with 3 mm (4 modified punches in 4 stems) and 4 mm opening diameter (8 modified punches in 8 stems) were used. Subsequently, between 0.5 and 1 ml of a liquid colourant Royal Blue L85010-SC (aqueous solution of water-soluble blue dyes which is non-toxic to the *Phalaenopsis* pot plant) was provided into the modified punches using an injection device (see FIG. 7).

The upward direction of the modified punches prevented leakage of colourant from the modified punches. Air could escape from the small opening between the upper part of the stainless steel part of the modified punch and the stem and the liquid colourant could freely flow to the tissue of the stem.

After between 6 and 12 hours, the modified punches were carefully removed from the stems without removing any tissue from the stems. Only a very small incision in the form of a hemicircle remained in the stems (see number (16) in FIG. 8). All flowers on the treated stems had homogeneously turned blue.

Four days after the colouring experiments, the stems were cut open in a direction parallel to a longitudinal axis of the stem. No hole in a direction parallel to a longitudinal axis of the stem was observed behind the place were the modified punch was forced into the stem.

Comparative Example 2

Example 1 was repeated with the unmodified punches from Ribbel International Limited, India. On filling the unmodified punches with the liquid colourant, it was observed that an air bubble prevented the liquid colourant to freely flow to the stem of the *Phalaenopsis* pot plant. Even after 24 hours, hardly any change of the colour of the flowers of the *Phalaenopsis* pot plant was observed. On removal of the unmodified punches from the stems, the plug of stem tissue that had filled part of each unmodified punch on pushing the unmodified punch into the stem was removed from the stem. The resulting *Phalaenopsis* pot plants thus had a hole in the form of a bore with a diameter of either 3 or 4 mm in each stem.

Comparative Example 3

Example 1 was repeated with a standard needle-syringe combination without plunger/piston. The needle had a diameter of 2 mm. On filling the syringe with the liquid colourant, it was observed that an air bubble prevented the liquid colourant to freely flow to the stem of the *Phalaenopsis* pot plant through the needle. No pressure was applied. Even after 24 hours, hardly any change of the colour of the flowers of the *Phalaenopsis* pot plant was observed. On removal of the needles from the stems, the plug of stem tissue that had filled part of each needle on pushing the needle into the stem was removed from the stem. The resulting *Phalaenopsis* pot plants had a hole in the form of a bore with a diameter of 2 mm in each stem.

The invention claimed is:

1. A method for changing the natural colour of the flower or flowers of a pot plant, said method comprising the steps of:

(i) providing a pot plant having one or more stems, one or more flowers and a root system surrounded by a potting medium for pot plants;

(ii) providing a tubular injection device comprising a hollow tube having a wall with a thickness (d) in a radial direction of the hollow tube, a maximum size (D) in a radial direction of the hollow tube, a length (L) in a longitudinal direction of the hollow tube and two ends, wherein part of the wall of the hollow tube at one of the ends is removed so that an opening of the hollow tube at the end has the form of an open gutter, wherein the part of the wall of the hollow tube at the end that is removed extends from the end over a first distance ($L_1$) in the longitudinal direction of the hollow tube;

(iii) forcing the end of the hollow tube into the tissue of a stem of the pot plant over a second distance ($L_2$) that is smaller than first distance ($L_1$);

(iv) providing colourant with a colour different from the natural colour of the one or more flowers to the hollow tube of the tubular injection device;

(v) exposing the tissue of the stem to the colourant of step (iv) for a period of time sufficiently long to change the colour of the one or more flowers; and (vi) removing the tubular injection device from the stem of the pot plant, wherein no tissue is removed from the stem of the pot plant.

2. The method according to claim 1, wherein in step (iii) the end of the hollow tube with the hollow gutter is forced into the tissue of a stem of the pot plant such that a convex surface of the wall at the opening in the form of the open gutter is facing downwards and a concave surface of the wall at opening in the form of an open gutter is facing upwards, wherein the upward direction is a direction parallel to a longitudinal axis of the stem from the root system to the one or more flowers.

3. The method according to claim 1, wherein in step (iii) the end of the hollow tube with the hollow gutter is forced into the tissue of a stem of the pot plant at an angle with the stem, such that end of the hollow tube points upwards, wherein the upward direction is a direction parallel to the longitudinal axis of the stem from the root system to the one or more flowers.

4. The method according to claim 1, wherein the period of time applied in step (v) is between 2 and 24 hours.

5. The method according to claim 1, wherein the thickness (d) of the wall at the end with the hollow gutter is between 0.1 and 1 mm.

6. The method according to claim 1, wherein the maximum size (D) in a radial direction of the hollow tube at the end with the hollow gutter is between 1 and 5 mm.

7. The method according to claim 1, wherein the hollow tube has a circular, oval, triangular, square or rectangular cross section, or a combination thereof in a radial direction of the hollow tube.

8. The method according to claim 1, wherein the opening in the form of an open gutter is a beveled part of the hollow tube.

9. The method according to claim 1, wherein the wall of the hollow tube at the opening in the form of an open gutter has the form of part of a circle, part of an oval, part of a square, part of a triangle, or part of a rectangle, in a radial direction of the hollow tube.

10. The method according to claim 9, wherein the wall of the hollow tube at the opening in the form of an open gutter has the form of a hemicircle, in a radial direction of the hollow tube.

11. The method according to claim 1, wherein the first distance ($L_1$) is between 3 mm and 2 cm.

12. The method according to claim 1, wherein the tubular injection device further comprises a reservoir suitable for holding colourant.

13. The method according to claim 12, wherein the tubular injection device is a needle equipped with a syringe, wherein the needle is the hollow tube and wherein the syringe comprises the reservoir.

14. The method according to claim 1, wherein the colourant provided in step (iv) is a liquid colourant.

15. The method according to claim 1, wherein the colourant is blue.

16. The method according to claim 1, wherein the one or more flowers of the pot plant provided in step (i) have a natural colour chosen from the group consisting of white, off-white, pearl, ivory and yellow.

17. The method according to claim 1, wherein the pot plant provided in step (i) is chosen from the group consisting of the orchid family (orchidaceae), *Anthurium* and *Spathiphyllum*.

18. The method according to claim 1, wherein the end of the hollow tube with the hollow gutter is forced in step (iii) into the tissue of a stem of the pot plant over a second distance ($L_2$) that is between 1 and 4 mm.

19. The method according to claim 1, wherein the end of the hollow tube with the hollow gutter is forced in step (iii) into the tissue of a stem of the pot plant within 5 cm from the root system.

* * * * *